Aug. 15, 1967   C. P. ZOETHOUT   3,336,008
APPARATUS FOR TREATING VISCOUS MATERIAL
Filed March 10, 1965                     3 Sheets-Sheet 1

INVENTOR.
CARL P. ZOETHOUT
BY
Luke J. Wilburn, Jr.
ATTORNEY

Aug. 15, 1967 C. P. ZOETHOUT 3,336,008
APPARATUS FOR TREATING VISCOUS MATERIAL
Filed March 10, 1965 3 Sheets-Sheet 2

INVENTOR.
CARL P. ZOETHOUT
BY
ATTORNEY

Aug. 15, 1967

C. P. ZOETHOUT 3,336,008

APPARATUS FOR TREATING VISCOUS MATERIAL

Filed March 10, 1965

INVENTOR.
CARL P. ZOETHOUT
BY

*Luke J Wilburn Jr*
ATTORNEY 3,336,008
APPARATUS FOR TREATING VISCOUS MATERIAL
Carl P. Zoethout, Arnhem, Netherlands, assignor to American Enka Corporation, Enka, N.C., a corporation of Delaware
Filed Mar. 10, 1965, Ser. No. 438,664
Claims priority, application Netherlands, Mar. 11, 1964, 64—2,478; Mar. 28, 1964, 64—3,379
7 Claims. (Cl. 259—6)

This invention relates to a method and apparatus for treating highly viscous material and is particularly useful for blending, mixing, or degasifying reactive materials of polymerization. More specifically, this invention concerns an improvement over U.S. Patent application Ser. No. 419,129, commonly assigned herewith and relating to a method and apparatus for polymerizing highly viscous material used to produce film- and fiber-forming products.

In the above-mentioned patent application, highly viscous substances such as polyester, polyamide, and other polymeric compositions are subjected to a mixing and blending operation by the use of an apparatus consisting of two parallel, spaced rollers cooperating to form a material-receiving trough area between their upper surfaces. Simultaneous rotation of the rollers in opposite directions causes a viscous gob of material, superimposed thereon, to be drawn into the nip area between the roller surfaces where the material is pressed into a thin sheet. The sheet, upon leaving the nip area, is divided into two thin films which adhere to the two respective roller surfaces. These films are circumferentially transported by the roller surfaces back into the rotating gob of material in the trough area between the rollers where they are once again blended into the viscous mass.

In order to improve the blending, mixing, and degasification of the material, the above-mentioned application provides a comb device consisting of a plurality of hollow, open-ended teeth which extend from above the rotating viscous gob down through the gob and terminate in the nip area of the rollers. The system is maintained under a partial vacuum and the hollow teeth, which communicate with the exterior atmosphere, divide the material passing through the nip area with the aid of the positive gas pressure provided at the tooth ends. A series of upstanding ribs, perpendicular to the plane of the film on each roller surface, is thus formed as the viscous sheet divides into the roller surface films. The ribs thus created increase the surface area of the films as much as 200–300%, depending on the particular relationship of the teeth to the nip area of the rollers.

The ribs aid in the polymerization reaction in several ways. Because of the increased surface area, undesirable gaseous components can be more effectively removed from the viscous material when a partial vacuum is maintained on the system. The ribs, upon being pressed back into the rotating gob between the rollers, are folded or pleated, thus allowing a more efficient blending the components of the mixture. Additionally, when high and low viscosity substances are to be blended, the pleating or folding effect occurring just prior to recombining can be used to entrap surrounding vapor into the reaction mixture, and the low viscosity material may be introduced into the system in vaporous form to bathe the highly viscous material and be blended quite effectively therein.

Although the former application improves the mixing, blending and degasifying effects of known parallel roller type blending apparatus, it has several disadvantages. Because atmospheric pressure at the comb tooth ends is necessary to produce an effective rib height, it is difficult to maintain a partial vacuum on the system and great expense is involved in providing a suction source to maintain the desired partial pressure on the system. Additionally, the highly viscous nature of the material located in the trough area of the rollers requires a large amount of energy to create and maintain rotation therein. Because the teeth of the rib-forming comb extend into the rotating gob, they hinder rotation thereof and require an even greater power source to produce an effective blending of the material throughout the gob. Because of the stresses exerted on the comb by the rotating gob, it is necessary to mount the comb quite firmly, which adds to costs in construction.

It is an object of the present invention to overcome the disadvantages of the type blending apparatus mentioned above.

It is a further object of this invention to provide an improved process and apparatus for effectively blending, mixing, and degasifying highly viscous material.

Another object of the invention is to provide a blending apparatus for effectively polymerizing highly viscous substances in which degasification of the material is desirable.

The manner in which these and other objects of the invention are attained will become apparent from the following description of the invention, which is intended to be illustrative rather than limitative.

According to the present invention, it has been discovered that ribs may be effectively produced in the surface films of a parallel roller type mixing apparatus by mounting a comb beneath the nip area of the rollers having solid teeth extending upwardly into the nip area.

With the comb teeth extending upwardly into the nip area of the rollers, it has been found that it is no longer necessary to supply a gas pressure at the tooth ends to produce an effective rib height. In eliminating this requirement, the operating time of vacuum pumps which maintain partial pressure on the system is decreased. Because it is no longer necessary to extend the teeth through the gob of material, power requirements necessary to maintain effective rotation of the gob are greatly reduced and the strength of the teeth is no longer as critical, thus eliminating costs in constructing the apparatus.

It has also been found that the surface area of the material being treated may be further increased by providing longitudinal reorientation bars circumferentially spaced about the rollers a short distance from the roller surfaces and submerged in the material film on the rollers.

With respect to the location of the comb and rib-producing teeth beneath the nip area of the rollers, it has surprisingly been found that the surface films which split apart from the sheet at the nip area show no tendency to follow the surface of the teeth, but are effectively maintained on the roller surfaces. Except for the points of the teeth, the comb device remains absolutely free of the materials being treated.

The height of the ribs can be controlled quite effectively by varying the extent to which the teeth extend into the nip area. It is thus possible to vary the rib height in the longitudinal direction of the rollers or compensate for the influence of viscosity on rib heights by varying the extent to which the teeth reach between the rollers.

By the use of the solid teeth located under the material gob, energy consumption is 50% lower than in the case of the known apparatus because the braking wall surface of the gob is now reduced to a minimum. Dissipation of energy in the material being treated is reduced and an increase in the temperature of the product is avoided.

This is of great importance in the case of highly viscous material when temperatures must be controlled within narrow limits.

As indicated briefly above, the surface area of the ribs formed by the comb teeth can also be increased by the employment of stationary reorientation bars located circumferentially around and closely adjacent the roller surfaces. These bars produce a zigzag pattern in the ribs passing over them. It is necessary that the bars be positioned beneath the surface of the main body of the film to enable the rib portion of the film to pass over them. The ribbed material flowing on the outer surface of the bar is changed in its radial speed by local retardation around the bar surface. Because of the high viscosity of the material being treated, this retardation does not increase the thickness of the standing ribs but the rib is consequently folded in a zigzag pattern as it passes the bar. Remarkably, it has been found that the flow pattern of the liquid remains perfectly stable within wide limits of roller speed variation. After the ribs pass over the reorientation bar, the folded portion of the ribs gradually rises to resume its original shape in a plane perpendicular to the roller shaft.

Although it is possible to provide a separate reorientation element under each standing rib, it has been found that a much simpler construction can be produced by extending a single bar over the entire length of the roller surface. Thus, a single bar simultaneously creates folds in all the liquid ribs on one roller. Although a single bar may be employed on each roller surface, the increased surface area is more effective if the liquid ribs remain folded throughout most of their travel from the nip area back to the rotating gob. To accomplish this, a plurality of reorientation bars are spaced at equal intervals along the two roller surfaces. Although the transverse dimensions of the bars are of little influence on the folding effect in the ribs, the bar cross section should be as small as possible in order that the energy loss of the apparatus may be reduced to a minimum. The cross section is preferably shaped to avoid abrupt angles in the direction of initial material contact. Highly successful results have been obtained utilizing bars having a semicircular shape in cross section with their flat side facing the roller surface. The lateral displacement of the liquid ribs is influenced by the dimension of the bars, and this displacement is preferably kept smaller than the distance between the undisturbed ribs to avoid the flowing together of the ribs.

In order to further illustrate the present invention, reference is made to the accompanying diagrammatic drawings, wherein FIGURE 1 is an elevational view, partially in cross section, taken in the direction of line I—I of FIGURE 2, and showing the position of the upstanding, solid rib-forming teeth with respect to one roller surface;

Figure 1:
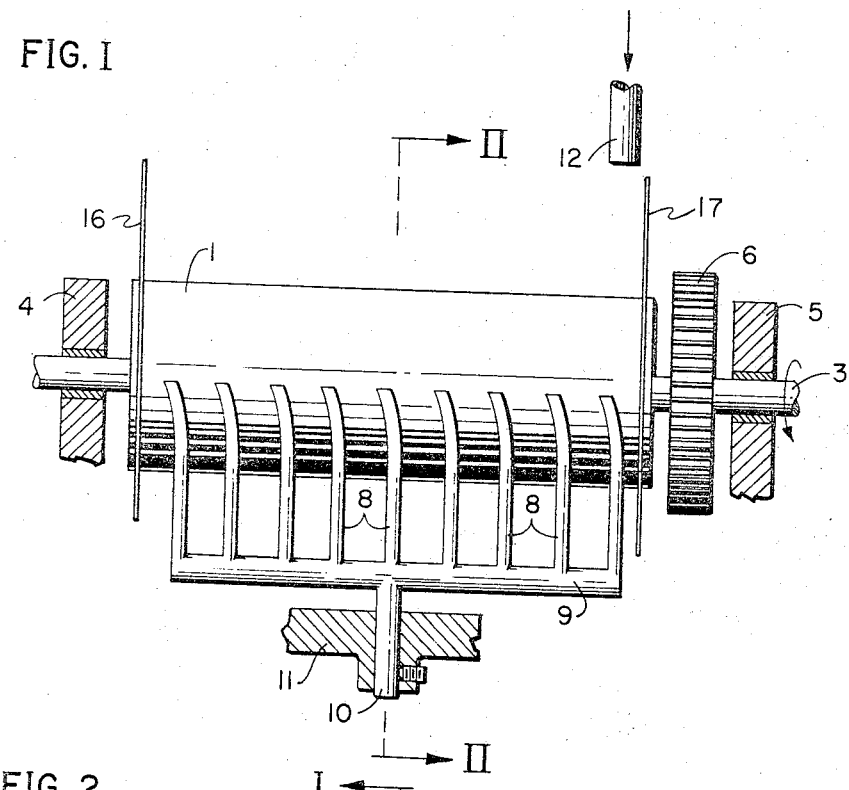
Figure 2:
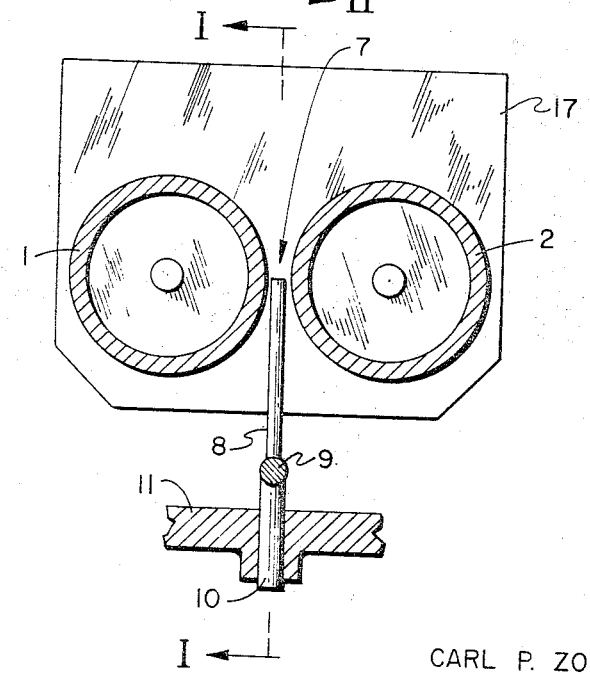
FIGURE 2 is an end elevational view, partially in cross section, taken along II—II of FIGURE 1 and showing the relationship of the comb teeth to the nip area of the rollers.

In FIGURES 1 and 2, parallel, cylindrical rollers 1 and 2 are positioned a short distance from each other. Roller 2 is mounted on a freely rotatable shaft and roller 1, on shaft 3, is driven by roller 2. The rollers rotate in the direction indicated by the arrow. The supporting shafts are mounted for rotation in suitable bearings provided in housing walls 4 and 5. The rollers 1 and 2 are intercoupled by means of identical gears, one of which is identified by numeral 6. They are connected in such a way that they rotate in opposite directions and at the speed. A comb device is located below the rollers and has solid teeth 8 which extend upward into the nip area between the rollers. The teeth 8 are are connected by support bar 9 to a vertical support 10 which is adjustably attached to a conventional sealed housing surrounding the entire apparatus. The entire comb device may be raised or lowered by suitable means (not shown) to vary the distance teeth 8 extend into the nip area 7. For example, support 10 may be threaded and lock nuts may be used to adjust the same vertically with respect to the housing. Alternatively, teeth may be adjusted individually by conventional means to vary the rib height along the longitudinal axis of the rollers. Although the size and shape of the individual teeth may be varied to produce the desired rib configuration, the teeth are preferably rectangular in shape with the long axis of the rectangle disposed perpendicular to the longitudinal axes of the rollers.

Figure 3:
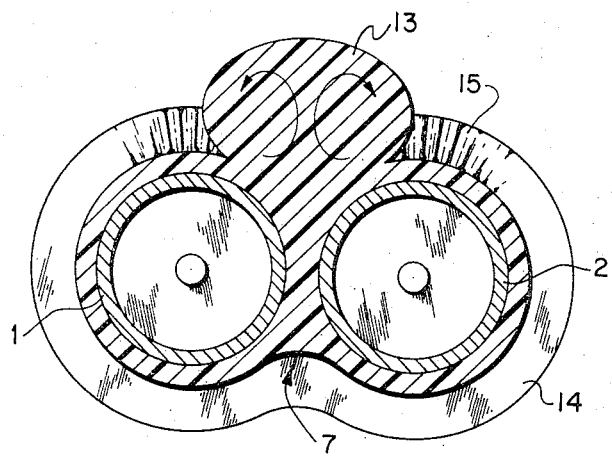
FIGURE 3 is a cross sectional view of the apparatus similar to FIGURE 2 but omitting the comb device and showing the flow pattern of the reaction mixture being treated.

A part of the enclosing housing 11 is shown. The material to be treated by the mixing apparatus is fed into the nip section 7 of the rollers by supply conduit 12. The entire apparatus may be maintained under a partial vacuum by conventional pumping means attached to the sealed housing. The material introduced through conduit 12 flows to the opposite end of the rollers and may be removed from the mixer by conventional doctor blade means (not shown). Movement of the material from inlet conduit 12 along the surface of the rollers to discharge point may be aided by curving the ends of teeth 8 as shown in FIGURE 1. The highly viscous material mass 13 is positioned between the rollers in the form of a large gob or roll. See FIGURE 3. The roll of material is enclosed at each end of the rollers by partitions 16 and 17, shown schematically in FIGURE 1. The position of the roll 13 is extremely stable and its shape is governed by the viscosity of the material and the speed of the rollers 1 and 2. Inside this roll, the material mass circulates vigorously in directions indicated by the arrows. Part of the material gob is continuously transported by the rollers through the nip 7 created between the rollers and separated into two films, each of which is entrained by a roller. As the material films thus formed travel to the top of the rollers, they are pressed back into roll 13. A pleating or ruffling effect 15 is produced by the gob or roll 13 in the ribs as they are fed into the mass. This ruffling effect is particularly advantageous when the apparatus is to be used in blending operations.

The contact action of teeth 8 causes a localized thinning of the film of material on rollers 1 and 2 and the subsequent formation of high membranous ribs 14 in transverse planes between the teeth. The height of these ribs is preferably between 1–1.5 times the width of the space between them. However, such spacing and rib height may be controlled by the number of teeth utilized, the distance between rollers 1 and 2, and the extent to which the teeth protrude into the nip area 7. Utilizing a tooth spacing to produce ribs having a height of 1–1.5 times the width, a surface enlargement of 200–300% is obtained in the material on the rollers.

Figure 4:
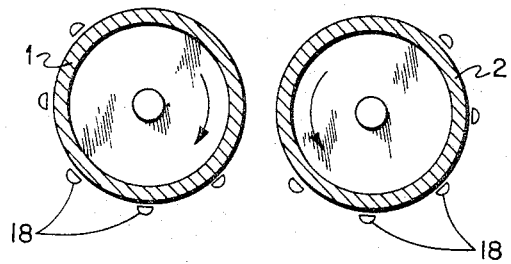
FIGURE 4 shows in cross section a modified form of the invention in which reorientation bars are utilized adjacent the surface of the rollers.
Figure 5:
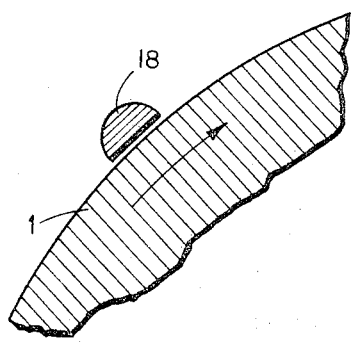
FIGURE 5 is an enlarged cross sectional view showing the details and relationship of a particular reorientation bar and roller surface.

FIGURE 4 represents a modified form of the invention and shows the arrangement of a plurality of reorientation bars 18 about rollers 1 and 2. The comb and tooth device has been removed to more clearly show the spacing of the bars. The bars may be mounted in end partitions 16 and 17 (not shown), or in any other suitable manner. A particularly desirable shape of the bars is shown in detail in FIGURE 5. The bar 18 is provided with a semicircular cross section with the flat portion of the semicircle adjacent roller 1. In this way, blind angles are avoided as much as possible and the power required to move the viscous ribs over the reorientation bar is maintained at a minimum.

Figure 6:
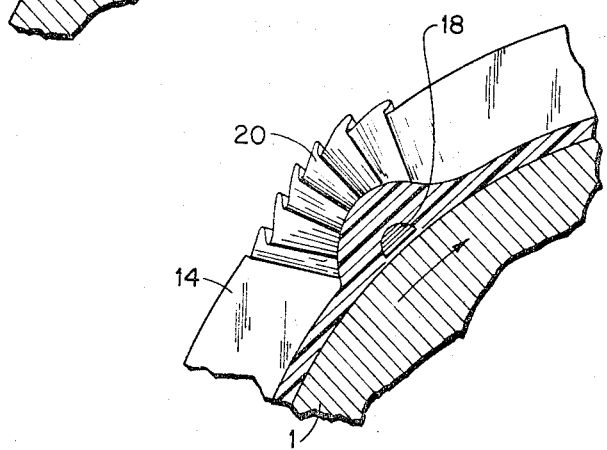
FIGURE 6 illustrates a partial cross section of a roller and bar similar to FIGURE 5, but showing in greater detail the relation of the bar to the roller surface and its effect on the material ribs being treated.
Figure 7:
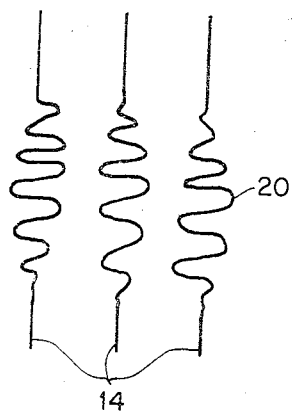
FIGURE 7 is a partial plan view of the facing surface of the roller of FIGURE 6 showing the configuration of the ribs above a reorientation bar.

FIGURE 6 shows the pleating phenomenon produced in the rib 14 during its passage over reorientation bar 18. At the bar 18, the material is retarded and accumulates into a plurality of pleats 20 which, upon passing the bar, tend to regain their former rib configuration. As can be seen, the material film passes both below and above the bar 18, thus insuring that the bar is submerged within the film at all times. By locating a plurality of such bars about the circumference of the rollers, as shown in FIGURE 4, the ribs 14 can be repeatedly pleated in their passage from the nip area 7 to the revolving gob of material 13. FIGURE 7 shows a schematic plan view of the pleated disposition of the material ribs 14 as they pass over a reorientation bar.

It will be clear that the bar 18 shown in FIGURE 4 will keep the ribs pleated along a substantial portion of their travel and, as a result, the free surface of these ribs is enlarged approximately 3–4 times. In addition, the residence time of the ribs on the roller surfaces is increased by the retarding effect of the bars. By maintaining the bar shapes of such configuration to avoid blunt or blind angles, energy dissipation in the apparatus, as a result of friction, is kept at a minimum. Depending on the nature of the process to be carried out by the apparatus, the clearance between the rollers and the teeth may be varied and the number of reorientation bars utilized may be changed.

Increase in the material surface area of a material being treated is highly desirable when the apparatus of the invention is used to increase the chain length of a synthetic polymer, such as polyethylene terephthalate, by polycondensation. In such a process, the viscosity of the polymer can be increased by evaporating glycol from the reaction mixture. Experiments have shown that polyethylene terephthalate treated in the present apparatus produces a glycol evaporation rate much greater than that obtained with the known roller mixers.

It is obvious from the above description that the invention may be used to perform a variety of functions and the methods of material treatment practiced thereby may vary. The extent and scope of the invention is therefore only limited by the following claims.

What is claimed is:

1. An apparatus for treating highly viscous material, having parallel cooperating cylindrical rollers positioned alongside each other to form a material-receiving nip portion, a drive system for rotating the rollers in opposite directions, and a comb device located below said nip portion having a plurality of spaced solid teeth extending into the nip portion in a direction opposite to the rotation of the rollers.

2. Apparatus as defined in claim 1 in which said teeth are bent in the direction of the material outlet end of the rollers.

3. Apparatus as defined in claim 1 in which said teeth have their long axes perpendicular to the axis of the roller.

4. Apparatus as defined in claim 1 in which each of said rollers has at least one longitudinal reorientation bar located at the peripheral area of the roller surface and extending throughout the length of said roller.

5. Apparatus as defined in claim 4 in which said reorientation bar is semicircular in shape and has its flat side facing said roller surface.

6. In an apparatus for treating highly viscous substances comprising two cylindrical rollers positioned substantially parallel to and at a short distance from each other, a driving system for rotating said rollers in opposite directions, the improvement which comprises a comb located beneath said rollers and having a plurality of teeth extending into the nip area between the rollers in a direction opposite to rotation thereof.

7. In a process for treating highly viscous material comprising the steps of agitating a mass of the material, transforming a portion of the mass into a thin layer, forming a plurality of material ribs on the surface of the thin layer, degasifying the ribbed layer, and returning the layer to the agitating mass, the improvement which comprises transversely displacing the ribs formed on the surface of the thin layer by reorientation means during degasification to increase the surface area of the ribs and expose a greater amount of the material to degasification.

References Cited

UNITED STATES PATENTS

| | | | |
|---|---|---|---|
| 2,478,885 | 8/1949 | Alvey | 18—2 |
| 2,625,709 | 1/1953 | Schairer | 18—2 |
| 2,652,590 | 9/1953 | Sullivan et al. | 18—2 |
| 2,730,755 | 1/1956 | Hale et al. | 18—2 |
| 2,807,047 | 9/1957 | Olsen et al. | 18—2 |

WILLIAM I. PRICE, *Primary Examiner.*

WALTER A. SCHEEL, *Examiner.*

J. M. BELL, *Assistant Examiner.*